(No Model.)

G. & H. HEILER.
NUT LOCK.

No. 367,809. Patented Aug. 9, 1887.

WITNESSES:
Daniel H. Herr.
L. H. Kulp.

INVENTOR
George Heiler
Henry Heiler
BY
L. H. Kulp & Co
ATTORNEY

N. PETERS, Photo-Lithographer, Washington, D. C.

UNITED STATES PATENT OFFICE.

GEORGE HEILER AND HENRY HEILER, OF WEST EARL, PENNSYLVANIA.

NUT-LOCK.

SPECIFICATION forming part of Letters Patent No. 367,809, dated August 9, 1887.

Application filed December 15, 1886. Serial No. 221,632. (No model.)

*To all whom it may concern:*

Be it known that we, GEORGE HEILER and HENRY HEILER, of West Earl, in the county of Lancaster and State of Pennsylvania, have invented certain new and useful Improvements in Nut-Locks; and we do hereby declare the following to be a full, clear, and exact description of the invention, such as will enable others skilled in the art to which it appertains to make and use the same.

Our invention relates to nut-locking devices using a threaded bolt, nut, washer, and locking-key. We lock the nut firmly to the bolt by means of a V-shaped pointed locking-key having the two lateral faces beveled and dovetailed into the top face of the nut and held in place by a lug or strip extending radially from the center of the washer and bent upward over the outer face of the nut and over the rear end and on top of the locking-key. We attain this object by the mechanism illustrated in the accompanying drawings, similar letters referring to similar parts.

Figure 1:
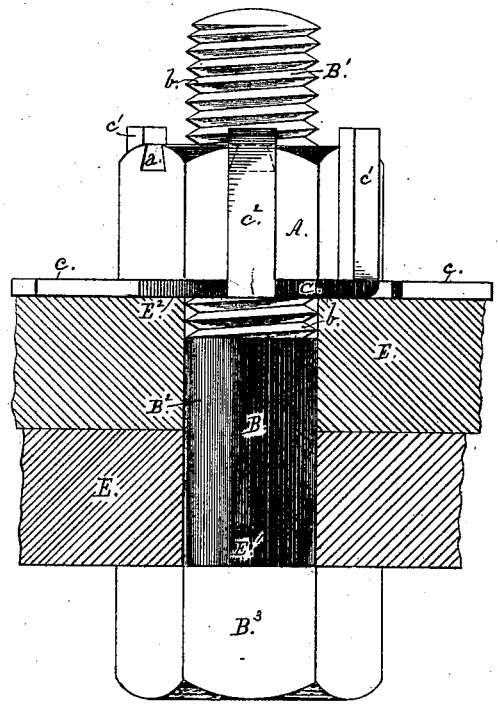
Figure 6:
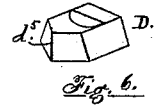
Figure 5:
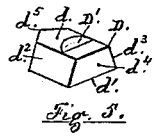
Figure 4:
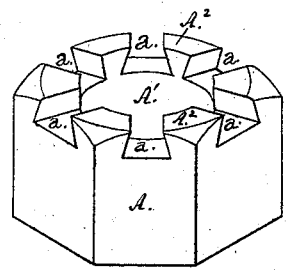
Figure 2:
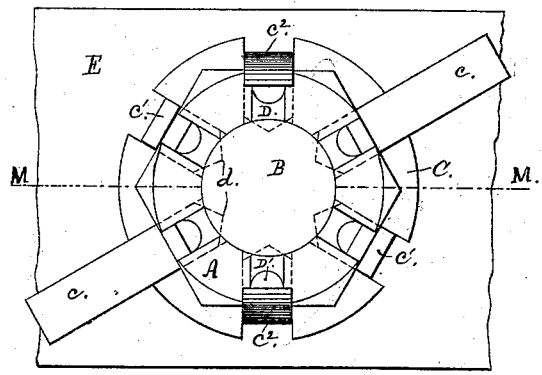
Figure 3:
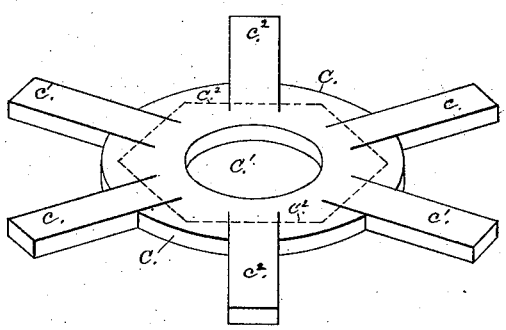

Figure 1 is an elevation of the bolt holding together sections of two pieces, E and E, through the line M M, Fig. 2, with the nut, key, and washer in place. Fig. 2 is a top plan view of Fig. 1. Fig. 6 is a perspective view of the locking-key, showing the V-shaped point, beveled sides, and recessed top. Fig. 5 is a perspective view of the locking-key, showing the back end, beveled sides, and top. Fig. 4 is a perspective view of a hexagonal nut, showing three of its vertical faces, the dovetailed or grooved top, and the hole to receive the bolt. Fig. 3 is a perspective view of the washer with radial lugs or strips for a hexagonal nut.

The bolt B in Fig. 1 is a round piece of metal of proper length and thickness, having suitable threads $b$ cut on the end B', the plain shaft B², and a suitable head, B³.

The nut A, Fig. 4, is hexagonal in form, having in its hole A' proper threads to receive the bolt end B' of the bolt B, Fig. 1, and having cut in its upper face, A², six grooves or dovetails, $a$, all radial to the center of the nut and of size and form to receive the locking-key D, Fig. 6.

The washer C, Fig. 3, is circular in form, of a diameter greater than that of the nut, having extending from its periphery, radiating from the center and sixty degrees apart, six lugs or strips, $c\ c'\ c^2$, of a length sufficient to reach above the top of the nut A, Fig. 4, far enough to be bent over the end of the locking-key D, Fig. 5, to keep it in place, and having in its center the hole $c'$, Fig. 3, of a size sufficient to receive the bolt B, Fig. 1.

The locking-key D, Fig. 5, is a rectangular block of suitable metal, (say steel,) having the top and bottom faces, $d$ and $d'$, level and parallel, having the two lateral faces $d^2$ and $d^3$ beveled so as to conform with the sides of the dovetailed grooves $a$, cut in the top A² of the nut A, Fig. 4, having the back $d^4$ perpendicular to and at right angles with the top and bottom faces, $d$ and $d'$, and having the other end, $d^5$, pointed or V-shaped, so as to form a wedge, which is forced into the threads $b$ on the bolt B when the nut A is locked in position. The face of this V-shaped point is more fully shown at $d^5$, Fig. 6. In the upper face of this locking-key D and near its rear end is cut into it the hole or recess D', by means of which the key may be easily withdrawn when it is desired to unlock the nut.

The operation of our invention is as follows: The bolt B, the two sections E and E, the washer C, and the nut A being in place in position, as shown in Fig. 1, then by means of the thread $b$ on the bolt B we draw the nut A home, bringing it into the relative position with the lugs $c\ c'\ c^2$, as indicated by the dotted lines C² on the washer C, Fig. 3, and firmly secure the sections E and E between the head B³ and the washer C, as shown at E' and E², Fig. 1, the lugs $c\ c'\ c^2$ of the washer having the position indicated in Fig. 3. To lock the nut A we take the locking-key D, place it with its V-shaped end $d^5$ toward the bolt B, into the dovetailed groove $a$ of the nut A, and with a hammer drive its V-shaped point $d^5$ into the threads $b$ of the bolt B until the rear end, $d^4$, is flush with the face of the nut A. In this manner we place a locking-key, D, into every groove $a$ of the nut A. Bending the lug $c$, Figs. 1 and 2, upward against a vertical face of the nut A, it assumes a vertical position, as at $c'$, Figs. 1 and 2. Bending it forward over the rear end, $d^4$, and the top $d$ of the key D, it assumes the shape as at $c^2$, Figs. 1 and 2, and the nut A would be firmly locked to the bolt B. By inserting a suitable tool into the recess D', Fig. 5, cut in the upper face, $d$, of the locking-key D, and withdrawing it until the V-shaped point $d^5$ is free from the bolt-thread $b$, and treating all the keys in a similar manner, the nut A will be unlocked and can be readily removed or tightened.

In the description of our invention we show in use six locking-keys and a nut having six dovetailed grooves in its upper face, when in most or all cases one alone of each will answer the purpose. We have also described a locking-key having only one V-shaped point, while the key may be constructed having two or more such V-shaped points on its end. We also know that nut-locking devices using locking-keys with V-shaped edges or faces acting on the thread of the bolt are invented; but these keys act as wedges between the nuts and bolts, being applied by means of tapering slots or grooves cut vertically into the inner faces of their respective nuts from top to bottom. We know of none but our own using dovetailed grooves cut radially into the upper face of the nut and using locking-keys constructed and applied as herein described and specified.

Having thus fully described our invention, what we claim as new, and desire to secure by Letters Patent, is—

In a nut-locking device, the combination of the following elements: the bolt B and the nut A, said nut having dovetailed radial recesses in its upper face, the key D, adapted to fit any one of said recesses and to be forced into the thread of the bolt B, as set forth, and the washer C, having radially-projecting lugs adapted to turn up against the flat side of the nut A and rear end and over the upper face of the key D, holding said key in place in the dovetailed radial recess in the upper face of the nut A, substantially as set forth and described.

In testimony whereof we have hereunto subscribed our names in the presence of two subscribing witnesses.

GEORGE HEILER.
HENRY HEILER.

Witnesses:
  A. F. SHENCK,
  D. H. KULP.